United States Patent [19]

Yonezu et al.

[11] Patent Number: 4,720,440
[45] Date of Patent: Jan. 19, 1988

[54] MONOBLOCK SEALED LEAD-ACID STORAGE BATTERY

[75] Inventors: Kunio Yonezu; Masaharu Tsubota; Teruhiro Hatanaka, all of Kyoto, Japan

[73] Assignee: Japan Storage Battery Company Limited, Kyoto, Japan

[21] Appl. No.: 899,581

[22] Filed: Aug. 25, 1986

[30] Foreign Application Priority Data

| Oct. 2, 1985 [JP] | Japan | 60-220888 |
| Oct. 2, 1985 [JP] | Japan | 60-220889 |
| Oct. 17, 1985 [JP] | Japan | 60-232906 |

[51] Int. Cl.⁴ .......................................... H01M 10/14
[52] U.S. Cl. ...................................... 429/57; 29/623.2; 264/272.21; 429/160; 429/234
[58] Field of Search .............. 429/178, 161, 162, 181, 429/57, 59, 60, 160, 234, 122, 162; 29/623.1, 623.2, 623.3; 264/272.21

[56] References Cited

U.S. PATENT DOCUMENTS

| 3,496,018 | 2/1970 | Hamlen et al. | 429/181 |
| 4,209,575 | 6/1980 | McDowall et al. | 429/234 |
| 4,239,839 | 12/1980 | McDowall et al. | 429/161 |
| 4,331,747 | 5/1982 | Julian et al. | 429/160 |

*Primary Examiner*—Donald L. Walton
*Attorney, Agent, or Firm*—Sughrue, Mion, Zinn, Macpeak & Seas

[57] ABSTRACT

A sealed lead-acid battery formed by joining two halves of a battery container. Before joining, the separate halves have grids placed in adjacent recesses, separated by partition walls integral with the wall of the container half. Pairs of adjacent grids are electrically connected through the partition wall. The recesses are alternately filled with positive and negative active materials. Then the halves are joined with a porous separator in each cell of the combined halves separating positive and negative active materials.

9 Claims, 3 Drawing Figures

MONOBLOCK SEALED LEAD-ACID STORAGE BATTERY

BACKGROUND OF THE INVENTION

1. Field of the Invention

The present invention relates to a miniaturized sealed lead-acid storage battery enclosed in a monoblock container and having no fluid electrolyte.

2. Background Art

As portable devices and appliances have been developed and used widely, the demand for seal lead-acid storage batteries increases. Recently requirements for the miniaturization, for improvement in energy density and for the reduction in cost have become particularly strong.

Conventionally, a battery has been produced in such a manner that plates are cured and dried after being filled with paste and are formed and dried according to demand to thereby obtain a group of plates. The thus obtained plates are inserted into an injection-molded battery container, the cells are connected to each other, and then a cover is joined with the battery container. In this case, it has been difficult to reduce the battery in size as well as its thickness because of the two steps of molding the battery container and inserting the group of plates into the battery container. That is, in the molding step, an internal mold of a core may be displaced by a pressure of molten plastic in injection-molding in the case where the internal mold is thin. In the insertion step, it is difficult to insert a thin element into the battery container through a thin opening portion.

Further, there has been proposed a single cell battery constituted by joining two halves of a bisected battery container. Each of the halves have such an arrangement that a plate-like current collector is fixed to the half of the battery container and an active material is closely attached to the current collector. In this design, however, there disadvantages have arisen that not only is it difficult to maintain the adhesion between the current collector and the positive active material, but in the case where a power load of a portable apparatus or appliance requires 6-12 volts, it becomes necessary to provide three to six cells so that the connecting portions between terminals and cells become large in mass and bulk with an accompanying reduction of energy density.

SUMMARY OF THE INVENTION

Accordingly, an object of the present invention is to provide a battery of small size but high power density.

It is a further object of the invention to provide a battery formed of two halves, thereafter joined.

It is yet a further object to provide a multicell battery.

According to the present invention, the above-mentioned problems in the monoblock sealed lead-acid storage battery having no fluid electrolyte have been solved by the following means.

That is, according to the present invention, the monoblock sealed lead-acid storage battery having no fluid electrolyte is arranged such that, in each of two halves of a bisected battery container, a terminal passing through a cover is integrated with a grid. Respective grids of the two cells which have no external terminal are disposed adjacent to each other. Rather, they are connected with each other through connecting conductors which are passed through a partition wall between the adjacent cells at thicker or projecting portions of the partition wall. All the grids are fixed to the inner walls in the respective cells in the half of the battery container. Positive and negative active materials are filled alternately in the cells. The two halves of the bisected battery container are connected with each other so as to make positive and negative plates come into opposition to each other with a porous separator disposed therebetween.

DETAILED DESCRIPTION OF THE PREFERRED EMBODIMENTS

A lead-acid storage battery according to the present invention will be described by reference to FIG. 1, which is a partially cutaway longitudinal cross-section of an embodiment of the lead-acid storage battery and to FIG. 2 which is a cross-section of the same along a line A—A in FIG. 1.

Figure 1:
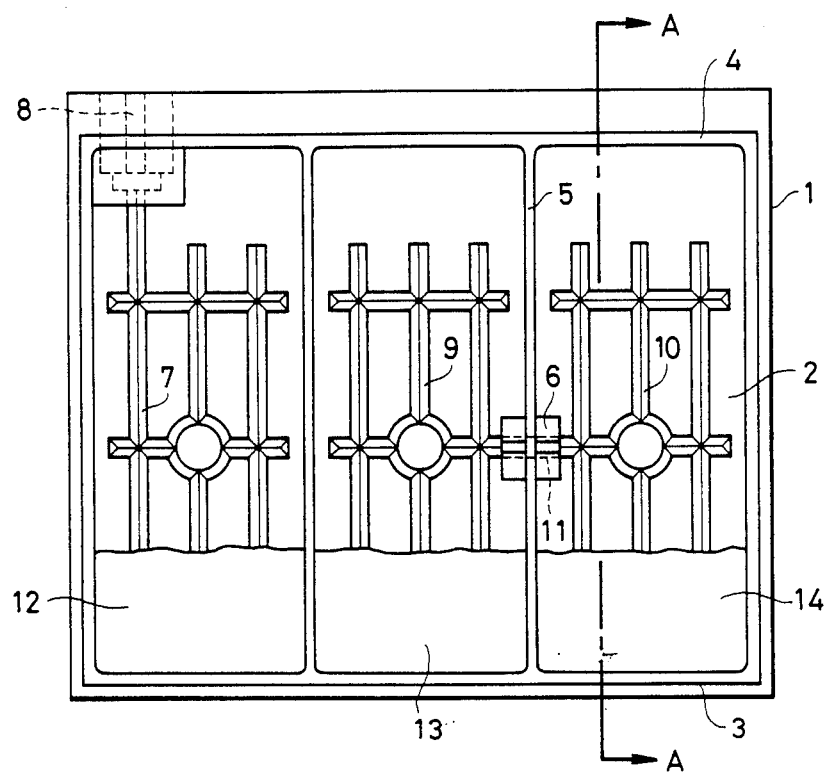
FIG. 1 is a partially cutaway cross-section showing an embodiment of the monoblock sealed lead-acid storage battery according to the present invention.
Figure 2:
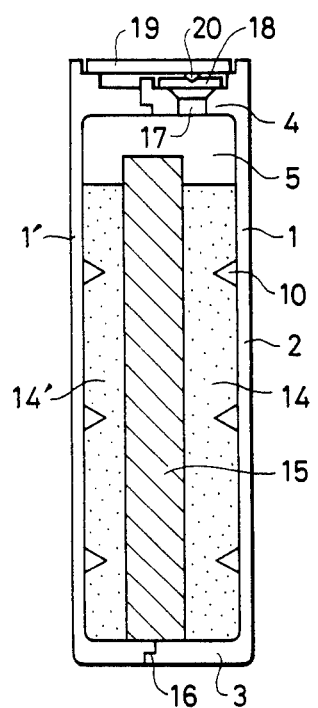
FIG. 2 is a cross-section taken along a line A—A of FIG. 1.

In FIG. 2 is shown on the right-hand side one half 1 of a bisected injection battery container for three cells, best illustrated in FIG. 1. The container 1 is built of, through integral molding, side walls 2, a bottom 3, an internal cover 4, partition walls 5, and thicker or projecting portions 6 of one of the partition wall 5. A lead alloy grid 7 of one cell at the end is connected to an external positive terminal 8. Lead alloy grids 9 and 10 for the other two adjacent cells are connected with each other through connecting conductors 11 in the projecting portions 6 of the one partition wall 5. A positive active material 12 is closely attached to the left-most grid 7 to cooperate with the grid 7 to form a positive plate. A negative active material 13 for the middle cell adjacent to the cell of the positive active material 12 is closely attached to its grid 9 to cooperate with the grid 9 to form a negative plate. A positive active material 14 for the right-most cell adjacent to the negative active material 13 is closely attached to its grid 10 to cooperate with the grid 10 to form a positive plate.

In FIG. 2 is shown another half 1' of the bisected injection battery container for the three cells arranged similarly to the one half of the bisected injection battery container 1. Positive and negative plates are arranged to be opposed to each other through a porous separator 15. That is, in FIG. 2, an active material 14' opposed to the positive active material 14 is a negative one. A connection portion 16 exists between the battery container halves 1 and 1'. There is an exhaust hole 17, a rubber safety valve 18 arranged to cover the exhaust hole 17, and an upper cover 19 having a projection 20 for pressing the rubber safety valve 18.

The projecting portion 6 and the connecting connecting conductor 11 for the battery half 1' are in a partition wall 5 separated by the middle cell from the projecting portion 6 of the other battery half 1. Also an external negative terminal (not shown) is equivalent to the positive terminal 8 but located in the other battery half 1' at the opposite end of the battery container from the positive terminal 8.

Figure 3:
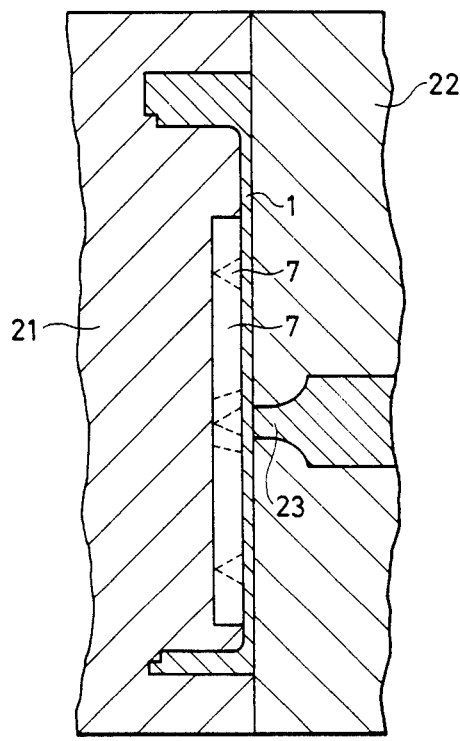
FIG. 3 is a longitudinal cross-section in part of a main portion of the bisected battery container according to the present invention showing a stage in injection molding of the battery container.

The grids 7, 9, and 10 and the connecting conductors 11 are fixed in a metal mold so as to be fixed in the bisected battery container during injection-molding. FIG. 3 shows a step in injection-molding the battery half 1. A similar step is performed for the other half 1'. The grid 7 is fitted into a recess of a metal mold 21. A second metal mold 22 is applied to the first metal mold 21 with a molten material injection gate 23 of the second mold 22 opposed to frames of the grid 7. A molten plastic is injected through the injection gate 23 with a large pressure to press the grid 7 against the metal mold 21, so that the plastic is prevented from entering between the grid 7 and the metal mold 21 where the plastic would excessively cover the opposite surface of the grid 7.

The molten plastic enters minutely uneven portions on the surface of the grid to fix the bisected battery container 1 and the grid 7 to each other. If the surface of the grid is too rough, however, the plastic enters along the surface of the metal mold 21 to cover the opposite surface of the grid. If the general average roughness at the center on the surface of the grid is selected to be equal to or smaller than 10 micrometers, it is possible to preferably prevent the above-mentioned entrance of the molten plastic along the surface of the metal mold 21. In order to obtain the above-mentioned surface condition, it is necessary to use minute silicone particles or a silicone plastic as a mold removing agent which is applied on the surface of the metal mold in the case of gravity casting or pressure casting. Further, in the case of die casting, a smooth back surface can be easily obtained.

The frame of the grid are tapered so that the opening areas are enlarged as the frames of the grid leave from the inner wall of the battery container. That is, the frames are larger on the side of the container walls 1 and 1'. This shape is advantageous in fixing the grid in the recess of the injection metal mold 21 and in fixing the molded bisected battery container and the grid to each other. Further, the shape is convenient in filling raw paste, as will described later.

The connecting conductors 11 are integrated with each other on the respective sides of the grids 9 and 10 at the center portion therebetween. In this arrangement, not only can the internal resistance of the battery be made small but the rotation moment about the connection conductors 11 can be made small when vibrations are applied to the battery, to thereby prevent the connecting conductors 11 from being damaged.

The connecting conductors 11 are passed through the partition wall at the thicker or projecting portions 11 thereof. That is, the connecting conductors 11 are covered with plastic over their surfaces along not only the thickness of the partition wall but also along an elongated distance of the projecting portion 11. This is advantageous in preventing respective electrolytes in the cells adjacent to each other from being connected and thus short-circuited with each other on the surface of the connecting conductors.

The positive and negative active materials are filled in the bisected battery container in which the grids and the connecting conductors have been fixed. There are two methods of filling the active material as follows.

In a first method, powder of lead or a lead compound such as lead power, litharge, red lead, or lead sulfate is mixed/kneaded with dilute sulfuric acid or water to provide raw paste, and a suitable quantity of the raw paste is put on and pressed against the respective grids in the battery container.

In a second method, powder of lead or lead compound or granulated matter of the same is filled in the battery container, added with a bonding agent such as water, dilute sulfuric acid or plastic emulsion as required and then pressed.

It is necessary to perform the placement and pressing of the raw paste against the grid in the state that the raw paste contains water not less than 5% by weight. This is important in causing the raw paste to be rheologically transformed to stick well to the grid. It is also important in making a good adhesion coupling between the raw paste and the grid without destroying the composition of the paste. Although having a rheological property, the raw paste cannot be freely transformed unlike a fluid, and it is preferable to mold the raw paste in advance in a form of a rectangle approximated to the shape of the plate when the raw paste is filled in the bisected battery container.

The two halves of the bisected battery container filled with given paste are joined at the side walls of the battery container with the positive plate in one of the halves and the negative plate in the other half opposed to each other with the porous separator disposed therebetween. The bonding of the battery container halves 1 and 1' is performed through ultrasonic welding or heating welding. In the method, the battery container halves 1 and 1' are bonded while force is exerted perpendicularly to the surfaces of the plates so that it is possible to assemble the battery in a state where the porous separator is pressed against the plates.

In ultrasonic welding, the battery container and the contents therein are vibrated by the ultrasonic waves are if the filled raw paste is dry, the raw paste is peeled from the grid to degrade the adhesion between the paste and the grid. On the contrary, if the ultrasonic welding is performed under the condition that the raw paste contains water not less than 5% by weight to provide a rheological property, the adhesion becomes rather good even if there exist gaps between the raw paste and the grid because the gaps are filled with the raw paste.

The two halves of the bisected battery container are thus joined to obtain a monoblock battery provided with three cell. Next, dilute sulfuric acid is poured into the battery container to perform battery formation. By the formation, the raw paste in the positive electrode is oxidized to be lead dioxide and the raw paste is the negative electrode is reduced to be lead.

The dilute sulfuric acid is poured through the exhaust hole 17 of the internal cover. At that time, the pouring can be performed in a short time if pressure in the battery has been reduced. The poured quantity of the dilute sulfuric acid is set so that the greater part of the fluid electrolyte has been absorbed and maintained in the plates when the formation has been completed. This condition is important to smoothly perform a so-called recombination reaction in which the oxygen gas produced from the positive plate is involved in a reaction on the negative plate to prevent water from being lost.

The positive plate is inferior to the negative plate in current efficiency in formation. Generally, the quantity of electricity of about 200% or more of a theoretical value is required in the formation of a battery container. To this end, it is necessary to pour a great quantity of dilute sulfuric acid in advance, resulting in, however, an undesirable overflow of the dilute sulfuric acid in the formation. In order to remove this disadvantage, it is effective to use a great quantity of red lead or lead dioxide as the raw material powder of lead for the positive paste.

Upon the completion of the formation, the exhaust valve and the upper cover are attached to the battery container to complete the latter.

Although an example of the monoblock sealed lead-acid storage battery having three cells is illustrated in the drawings, the number of cells may be changed, for example, into two, four, six, or the like, when the situation requires. When the number of the cells is selected to be odd, the positive and negative electrode terminals are respectively disposed in the different halves of the bisected battery container, while when the number of the cells is selected to be even, the positive and negative electrode terminals are disposed in the same half of the bisected battery container.

The monoblock sealed lead-acid storage battery according to the present invention has the following advantageous effects and characteristics.

1. Since such an arrangement, that the two halves of a bisected battery container are integrally provided with grids, the halves can be filled with paste and then bonded to each other. As a result, the battery can be made thin.

2. The two halves of the bisected battery container are bonded with each other while a pressure is applied. As a result, a high pressure can be applied to the surface of respective plates through a porous separator.

3. Connecting conductors are provided integrally with the respective grids in the two cells adjacent to each other. The connecting conductors also pass through a partition between the cells. As a result, it is not necessary to welding to connect the cells with each other. Furthermore, air tightness can be easily maintained at the partition. Also, the number of steps in assembling the battery can be reduced.

4. Raw paste is filled into the bisected battery container integrally provided with the grids, so that it is possible to reduce the number of handlings of the battery as well as to reduce the steps in manufacturing the plates.

5. The raw paste is pressed against the grids, so that the adhesion between the respective grid and the active material is good so as to stabilize the performance of the battery.

By reason of the above-mentioned effects, in the monoblock sealed laid-acid storage battery according to the present invention, not only the size as well as thickness can be easily reduced but the performance can be stabilized and the energy density can be improved.

We claim:

1. A monoblock sealed lead-acid storage battery using a non-fluid electrolyte, comprising:
   a plurality of porous separators;
   a bisected battery container composed of two separate halves joined together with said separators disposed side by side between said two halves; and
   a cover covering portions of a joined surface of said two halves;
   wherein each of said halves comprises;
   a container wall integrated with at least one partition wall to define at least two cell recess, corresponding cell recesses of said two halves being opposed to each other,
   said container wall and at least one partition wall being commonly injected molded,
   at least two conductive metal grids mold bonded to the inner surface of the injected molded container wall,
   two of said grids in combination of said two halves being integrated with two respective terminals passing through said cover, and
   in at least one of said halves, at least one connecting conductor connecting two respective grids and adjacent cell recesses which are not integrated with said terminals, each said conductor passing through the partition walls separating said adjacent cell recesses, and
   positive and negative active materials alternatively filled into said cell recesses, a cell recess of a first one of said halves which is filled with said positive active material being opposed to a corresponding cell recess of a second one of said halves filled with said negative active material with one of said separators disposed therebetween.

2. A battery as recited in claim 1, wherein frames of each of said grids is tapered away from a respective container inner wall so as to provide a larger surface of said frames facing said respective inner wall.

3. A battery as recited in claim 1, wherein each said connecting conductor is integrated with the two respective grids which it connects.

4. A method of manufacturing a monoblock sealed lead-acid storage battery having a non-fluid electrolyte, comprising the steps of:
   injection molding two separate halves of a bisected battery container to form container walls and partition walls of injection molded material,
   mold bonding at least two conductive metal grids fixably at the interface between a surface of the two conductive metal grids and the inner surface of the container wall with at least two conductive metal grids for each separate half of a bisected battery container being within respective cell recesses;
   joining said two halves under pressure with a porous separator disposed between each corresponding pair of cell recesses,
   causing two of said grids in the combination of said two container halves inwardly formed with respective terminals, to have respective terminals passed through a cover; and in at least one of said halves, connecting conductors between two respective grids in adjacent cell recesses which are integrated with said terminals by passing said conductors through the partition wall separating said adjacent cell recesses; alternately filling positive and negative material into said cell recesses to cause a cell recess of one of said halves filled with said positive active material to be opposed in said joining step to a corresponding cell recess filled with said negative active material with one of said separator disposed therebetween; and joining said two halves with said porous separator disposed between each corresponding pair of cell recesses and said active material within cell recesses under pressure whereby high pressure is effected through the surface of respective grids through said porous separator whereby the necessity of weld connecting conductors together to connect the cells defined by respective recesses to each other is eliminated and wherein, adhesion between the active material and the respective grids is enhanced to stabilize the performance of the battery produced thereby and wherein, the overall size and thickness of the battery is materially reduced.

5. The method as claimed in claim 4, wherein each separate half of a bisected battery container is molded within confronting first and second molds, said grids are fitted into recesses of said first metal mold, with the face of said grids to be mold bonded to said injection molded material being spaced from the surface of said second metal mold and wherein, said step of integrally molding said container wall and said at least one partition wall within said mold comprises injection molding molten plastic through an injection gate under heavy pressure within said second metal mold so that the molded plastic presses the grids against the first metal mold at said recesses whereby the plastic is prevented from entering between the grids and the surfaces defined by the recesses within the first metal mold so as to cover the surfaces of the grids opposite that the surface of the grid opposite said mold bonded to the half of the bisected battery container fixably mounting the same.

6. A method of manufacturing a monoblock sealed lead-acid storage battery having a non-fluid electrolyte, comprising the steps of:

injection and molding two separate halves of a bisected battery container with both halves having a plurality of corresponding cell recesses; forming integrated container walls and partition walls of injection molded material, mold bonding of conductive metal grids in respective corresponding cell recesses of both halves to the inner wall surface of said injection molded container wall, causing said injection molded material to be molded about two terminals integrated with respective grids by passing them through an injection molded material cover and simultaneously connecting respective grids of two adjacent cells which have no terminals integrated therewith through a partition wall between adjacent cells and projecting portions of said partition wall;

filling positive raw paste and negative raw paste, each containing water not less than 5% by weight, alternately into said cells in each of said two halves of said battery container; and bonding said two injection molded material halves of said battery container with each other under pressure so as to make positive and negative plates in different halves come into opposition to each other through a porous separator positioned therebetween; and pouring dilute sulfuric acid into each of said cells to perform battery formation.

7. A method of manufacturing a monoblock sealed lead-acid storage battery according to claim 6, in which said two halves of said bisected battery container are joined through ultrasonic welding in such a state that the content of water in the respective paste, which has not yet been subject to the formation, is equal to or more than 5% by weight.

8. A method of manufacturing a monoblock sealed lead-acid storage battery according to claim 6, in which the battery container formation is performed by pouring said dilute sulfuric acid in such a state that the content of water in the respective paste, which has not yet been subject to the formation, is equal to or more than 5% by weight.

9. The method as claimed in claim 6, wherein each separate half of a bisected battery container is molded within confronting first and second molds, said grids are fitted into recesses of said first metal mold, with the face of said grids to be mold bonded to said injection molded material being spaced from the surface of said second metal mold and wherein, said step of integrally molding said container wall and at least one partition wall within said mold comprises injection molding, molten plastic through an injection gate under heavy pressure within said second metal mold so that the molded plastic presses the grids against the first metal mold at said recesses whereby the plastic is prevented from entering between the grids and the surfaces defined by the recesses within the first metal mold so as to cover the surfaces of the grids opposite that the surface of the grid opposite said mold bonded to the half of the bisected battery container fixably mounting the same.

* * * * *